F. R. BRADSHAW.
APPARATUS FOR CARVING AND ORNAMENTING WOOD MOLDINGS AND THE LIKE.
APPLICATION FILED SEPT. 26, 1914.

1,208,470.

Patented Dec. 12, 1916.
5 SHEETS—SHEET 1.

F. R. BRADSHAW.
APPARATUS FOR CARVING AND ORNAMENTING WOOD MOLDINGS AND THE LIKE.
APPLICATION FILED SEPT. 26, 1914.

1,208,470.

Patented Dec. 12, 1916.
5 SHEETS—SHEET 3.

F. R. BRADSHAW.
APPARATUS FOR CARVING AND ORNAMENTING WOOD MOLDINGS AND THE LIKE.
APPLICATION FILED SEPT. 26, 1914.

1,208,470.

Patented Dec. 12, 1916.
5 SHEETS—SHEET 5.

Witnesses

Inventor
Frank R. Bradshaw,
by
Attorney.

UNITED STATES PATENT OFFICE.

FRANK RAY BRADSHAW, OF LONDON, ENGLAND.

APPARATUS FOR CARVING AND ORNAMENTING WOOD MOLDINGS AND THE LIKE.

1,208,470.  Specification of Letters Patent.  Patented Dec. 12, 1916.

Application filed September 26, 1914. Serial No. 863,732.

*To all whom it may concern:*

Be it known that I, FRANK RAY BRADSHAW, a subject of the King of Great Britain, residing at London, England, have invented certain new and useful Improvements in Apparatus for Carving and Ornamenting Wood Moldings and the like, of which the following is a specification.

The object of this invention is to construct an apparatus preferably affixable to an ordinary wood molding machine and operated by the moving wood as it leaves the molding machine whereby such molding can be carved and ornamented by cutting, chiseling, pressing or like operations during its progress through the apparatus; the molding being fed into the machine in an ordinary manner.

For the purpose of my invention I construct the apparatus with a series of rollers which act as a bed on which the molding travels to be varied or ornamented, a suitable adjustable fence or fences composed of rollers or strips being provided to insure the proper line of movement of the wood and adjustable pressure rollers shaped to suit shape of molding being also provided to grip the molding for insuring a proper movement of same through the apparatus, the bed rollers being smooth or preferably provided with short spikes or ridges to grip the wood and prevent slipping. In connection with these appliances I employ cutter disks having removable cutters and also shaped chisels fitted in the beds, and revolving spindles for holding tools, such disks, chisels and tools being capable of being positioned at any angle to suit angle of cut and also positioned to suit depth of cut, the cutters, chisels, or tool holding spindles, being connected up to the bed rollers by chain or any suitable mechanism to give them their motions to produce the desired result. The beds containing the chisels and also the frame containing the tool holding spindles are capable of being moved to and fro so as to perform their work, while the wood is moving with continuous feed of molding machine, the revolving cutters working continuously.

The cutters or chisels in the revolving disks and frames are capable of being placed at any angle and are easily removable and replaced and such cutters or chisels may be of any size and shape to suit the intending design.

The whole of the mechanism is carried by a frame affixable to or forming part of an ordinary wood molding machine and such mechanism is operated by the moving wood engaging the bed rollers and operating same, these rollers through suitable mechanism operating all the other parts in proper sequence.

The annexed drawings show an example of a machine constructed according to my invention, such mechanism being suitable for affixing to or forming part of a wood molding machine.

Figures 1, 2:
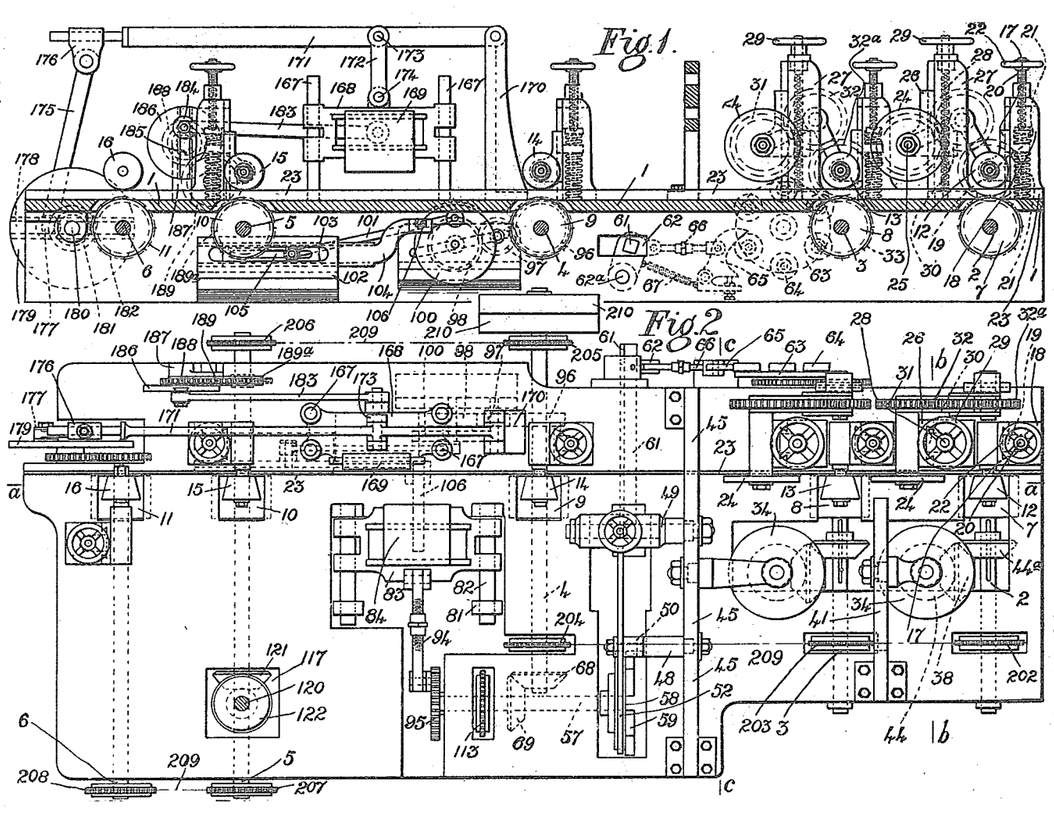
Figure 1 is a section of the mechanism and bed on the line $a\,a$ of Fig. 2.
Fig. 2 is a plan of the mechanism showing the principal parts, some being left out for sake of clearness and shown in other figures.

The machine as shown consists of a bed plate or frame 1 having underneath it shafts 2, 3, 4, 5 and 6 carrying bed rollers 7, 8, 9, 10 and 11, preferably having spikes, teeth or the like on their periphery which project through holes in the bed plate 1 sufficiently to be engaged and revolved by the molding as it is forced through from the molding machine (not shown) the molding entering at the right hand side of the figure.

Above each bed roller 7, 8, 9, 10 and 11 are positioned rollers 12, 13, 14, 15 and 16 for pressing the molding firmly on to the bed plate 1 and bed rollers 7, 8, 9, 10, 11. These presser rollers are carried by blocks 17 sliding up and down on standards 18 fixed to the bed plate 1. The blocks have lugs 19 through which pass screw spindles 20, the lugs 19 being operated upon by upper and lower springs 21 which can be compressed by turning the handle 22 and screw 20 and on compressing the springs will force the blocks 17 downward and with them the rollers 12, 13, 14, 15, 16, on to the molding as will be well understood. The presser rollers are detachable and are shaped to suit the contour of the molding being worked, different shaped rollers being used for different shaped moldings. To the bed plate 1 is also fixed a fence or fences 23 composed of strips against which the one edge of molding rests.

I will now describe the various mechanisms illustrated on the drawings for operating the various tools for the different forms of ornamentation, but it will be understood I do not usually use all the tools on one molding but only those tools necessary to give the ornamentation required.

For cutting relief designs I use a cutter disk 24 (to which are fixed chisels or other cutters) fixed on one end of an axle 25 carried in bearings in a block 26 which is slidable up and down a standard 27 fixed to the bed plate 1, such standard 27 has a screw spindle 28 and turn wheel 29, the screw 28 engages in a nut 30 on the block 26 so that by turning the wheel 29 and with it the screw 28 the sliding block 26 can be raised or lowered on the standard 27. The other end of the axle 25 has a gear wheel 31 which through gearing 32, 32ª is geared to another gear wheel 33 fixed on the shaft 2, so that in action the molding in passing through the machine will revolve the bed roller 7 and with it the shaft 2, gear wheels 33, 32 and 31 and cutter disk 24, the disk 24 revolving in the same direction as the wood is traveling.

By spacing the chisels or knives at different distances apart on the cutter disk the distances between the cuts in the wood can be varied.

I have only described one cutter disk and mechanism but in the drawings two are shown, and any number may be employed, each cutter disk being driven from a separate bed roller, the object of more than one cutter disk being employed is either to supplement, to vary the first cutting, or to produce a different cutting.

For horizontal or tilted cutting I use the mechanism hereinafter referred to and shown in Fig. 2 and in detail in Fig. 3, in which the cutter disk 34 is fixed on a spindle 35, the bottom of the spindle 35 rests in a bearing block pivoted to the shaft 36 which is carried by a block 37 so that the spindle 35 is capable of a tilting movement, the shaft 36 also carries a double bevel wheel 38. The top of the spindle 35 is carried in a movable bearing 39 which can be adjusted in a slot 40 in an arm 41 fixed to the bed plate 1, the object being that the spindle 35 and the disk 34 can be tilted to any desired angle. The block 37 can be adjusted to suit the width of the molding or the depth of cut required by the screw 42 working in the nut 43 as will be well understood.

To the spindle 35 is fixed a bevel wheel 44 meshing with the teeth on one face of the double bevel wheel 38 the teeth on the other side of the bevel wheel 38 meshing with teeth on a bevel wheel 44ª on the shaft 2 by which it is driven. The bevel wheel 44ª is slidable on the shaft 2 so that it can be disengaged from the bevel wheel 38 if this cutter is not required to be used. Two or more of these cutting disks 34 may be employed.

The above described cutters being revolved do not give a clean cut but more or less gouge the wood out. To obtain a clean cut I use the apparatus hereafter described and shown in Figs. 1 and 2, and in detail in Figs. 4 and 5, in which the chisel or cutter enters the molding and travels a certain distance with it before it is withdrawn.

To the bed plate 1, I fix a bridge 45 having two slots 46, 47 in which engage rods 48, 49 to which are pivoted bars 50, 51 which are connected together by an adjustable slotted connection 52. The bar 51 is bifurcated for over half its length and across the lower bifurcated part are rods 54 which loosely carry a block 55 (see Fig. 5); this block 55 carries the chisels or cutters 56. The bar 50 has a wedge or cam shaped plate or projection 53 and under the bed plate 1 is positioned a shaft 57 to which is fixed a disk 58 having on its outside face a number of smaller disks or rollers 59 against which disks the wedge like projection 53 on the bar 50 rides, springs 60 being employed to normally press the wedge 53 against the disks 59.

From the block 55 carrying the cutters is another bar 61 which extends across the machine and has a bearing in a rocking lever 62 which is pivoted to the bed frame 1 at 62ª. On the same side of the machine is also a disk 63 having smaller disks 64 on its outside face, the disk 63 is in gear with one of the gear wheels on the shafts, preferably shaft 3. Pressing against these disks 64 is a pivoted pawl 65 which is connected to the rocking lever 62 by an adjustable connecting rod 66, a spring 67 normally presses the pawl 65 against the disks.

In action the bars 50 and 51 are adjusted in the slots and in relation to each other by the slotted connection 52 to suit the width of molding and depth of cut required, and the shaft 57 is revolved by the shaft 4 through bevel wheels 68, 69, and this rotates the disk 58 and one of the disks 59 will ride against the wedge like projection 53 and force the bar 50 outward against the action of the springs 60 and with it the connecting bar 52 and bar 51, block 55 and cutter 56 which will enter the molding. In the meantime the disk 63 is also revolving and is timed to bring one of the disks 64 against the pawl 65 at the same time as the cutter enters the molding, the disk 64 will press the pawl 65 outward and with it the connecting rod 66, rocking lever 62, bar 61 and block 55, which block slides on the rods 54 in the direction the molding is traveling and at the same rate of travel. By the time the block 55 has reached the end of the rods 54, the disk 59 will have engaged the cam surface of the wedge projection 53 and moved the latter against the tension of the spring 60 and, when this disk 59 passes beyond the projection 54, the spring will return the projection between the escape disk and the next succeeding disk, and, in doing so, will take the bars 50, 52, 51 and block 55 with it withdrawing the cutter from the molding; the disk 63 also revolving will have taken the small disk 64 past the nose of the pawl 65, which in a similar manner will spring backward and carry the rod 66, lever 62, bar 61 and block 55 with it leaving the apparatus ready for a repeat operation.

Figures 3, 4, 5, 6:
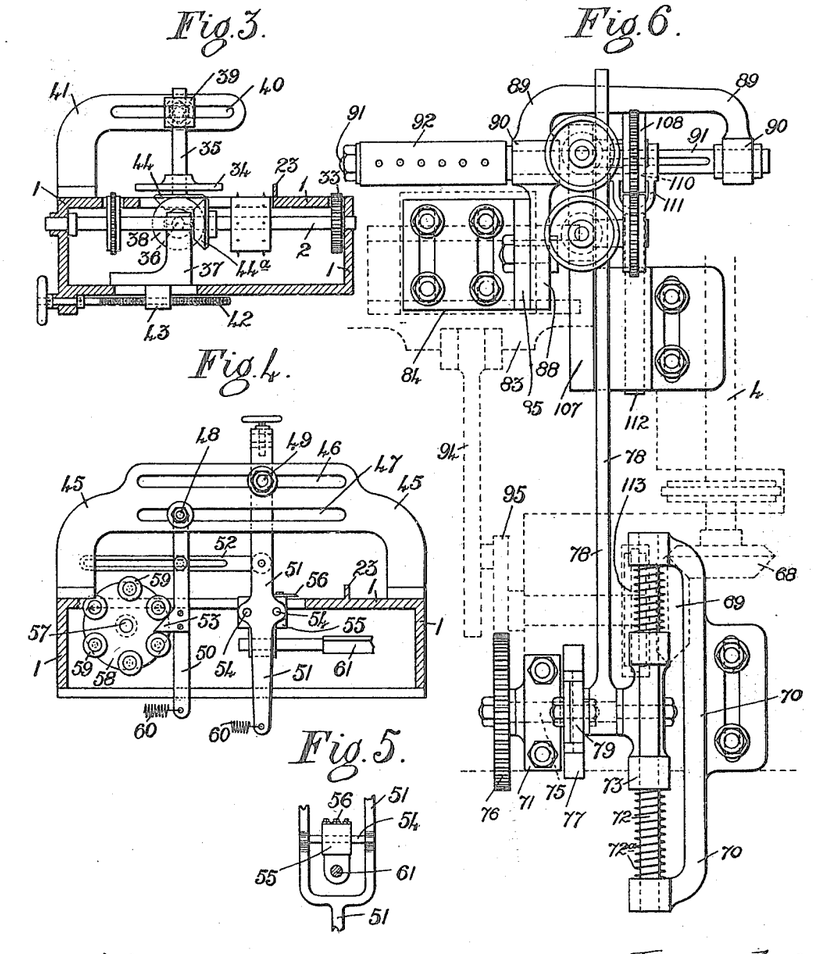
Fig. 3 is part sectional cross view of a portion of the apparatus on the line $b\,b$ of Fig. 2, showing the first driving bed roller and horizontal cutter disk.
Fig. 4 is part section on the line $c\,c$ of Fig. 2 showing a traveling chisel cutter for moving in a horizontal direction and along with the molding.
Fig. 5 is a detail view of the block and its bearing for receiving the chisels according to Fig. 4.
Fig. 6 is a plan and Fig. 7 front elevation of mechanism for revolving or reciprocating cutters, such mechanism being affixable to the carriage 84, Fig. 2.
Figure 7:
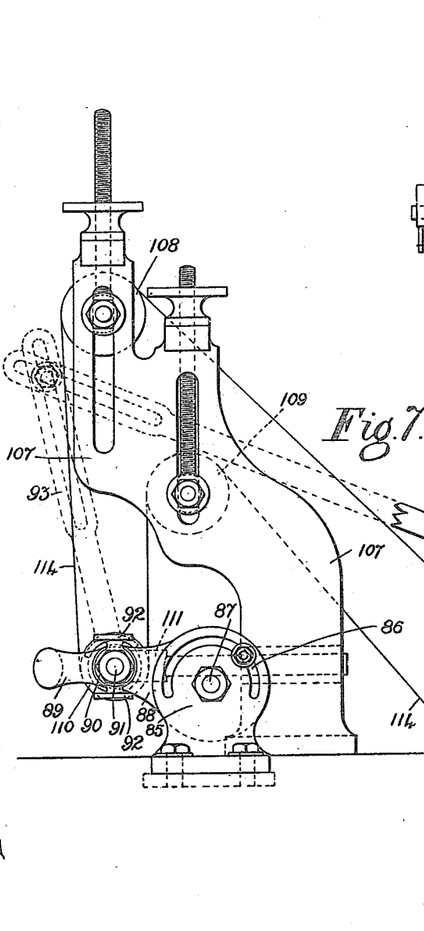

In Figs. 6, 7, I have shown mechanism for gouging the molding with upward or downward cuts, or cutters may be revolved, in both cases the cutters are reciprocated and travel with the molding. I will first describe this mechanism as a reciprocating cutter having an upward or downward cut or not revolving.

On some convenient part of the bed plate 1, I mount two brackets 70, 71, (see Fig. 6). The bracket 70 carries rods 72, and slidable on these rods 72 is a carriage 73 having a vertical slot 74. The bracket 71 has a bearing in which revolves an axle 75 to which is fixed at one end a cog wheel 76 and at the other end a star wheel 77. Riding freely in the slot 74 is a rod which carries a connecting rod 78 and a roller 79 which rides on the star wheel 77. On the bed plate 1 are projections 81 carrying rods 82 on which is slidable a frame 83. Across this frame 83 is a slidable carriage 84 to which is fixed a bracket 85 in which is a curved slot 86. Rotatably mounted on the bracket 85, at 87 is a plate 88 having an extension 89 of somewhat U shape. The plate 88 is adjustable by means of a bolt and nut in the slot 86 for raising and lowering the tool holder in regard to the work. In the extension 89 are bearings 90. In these bearings is an axle 91 which carries at one end a tool holder 92. Connected to the axle 91 in such a manner as to be able to partly turn the tool holder is a slotted rod 93 which is connected by a bolt and nut to the connecting rod 78, the slots in the rods allowing for various adjustments. The frame 83 is connected by an adjustable rod 94 to a crank disk 95 on the end of shaft 57 so that on revolving the shaft 57 the frame 83, bracket 85, tool holder 92 are reciprocated to and from the molding. On the opposite side of the machine I fix to the shaft 4 a gear wheel 96 which through other gear wheels 97, 98, revolve a crank disk 100 to which is connected one end of a rod 101.

To the bed plate 1 is attached a bracket 102 having guides 103 in which slides a bar 104 having a slot 105 in which can be fixed a pivot pin carrying the other end of the rod 101. The bar 104 is connected to the carriage 84 by a rod 106. The crank disk 95 is toothed and gears with the toothed wheel 76. In action the shaft 4 is revolved and through bevel wheels 68, 69 rotates shaft 57 and crank disk 95, which reciprocates the frame 83, carriage 84 and tool holder 92 to and from the molding. At the same time the crank disk 95 also revolves through gear wheel 76, the star wheel 77, which, in turn, operates upon the roller 79 causing the sliding carriage 73 to have an end on motion which reciprocates the rod 78. It will be obvious that the springs 72ª will return the carriage 73 after the roller 79 has escaped the tooth of the star wheel 77 by its upward movement in the slot 74. The rod 78 is connected to the rod 93 to oscillate the latter, which partly revolves the tool holder 92. At the same time the shaft 4 will through the gear wheels 96, 97, 98 revolve the crank disk 100 which through the connecting rods 101, 104 and 106 will reciprocate the carriage 84 to and fro in the direction of travel of the molding.

The parts are so timed that on the cutter entering the molding the star wheel 77 will partly revolve the tool holder 92 so that the cutter will make a curved cut up or down, at the same time the carriage 84 will reciprocate so as to travel with the molding and when the carriage reaches the end of its travel the frame 83 is drawn back withdrawing the cutter from the molding, the carriage will then be returned to its first position by the crank disk 100 as before explained, ready for a repeat operation.

In using the before explained cutter as a continuously revolving cutter I dispense with the use of the gear wheel 76, star wheel 77, carriage 73 and connecting rods 78 and 93, which may be thrown out of gear by any suitable means such as a clutch mechanism. In this case I mount a standard 107 on the bed plate 1 at the side of the frame 88. This standard 107 carries two adjustable chain pulley wheels 108, 109. On the axle 91 is also mounted a pulley wheel 110 in such a manner that it will allow the axle 91 to slide through it while at the same time it will revolve it, the pulley wheel 110 is prevented from sliding along with its axle 91 by a fork 111 having a leg 112 slidable in a hole in the standard 107. On the shaft 57 is mounted preferably a chain wheel 113 which through an endless chain or band 114 passing over the pulleys 108, 110, 109 drives the tool holder 92.

Figure 8:
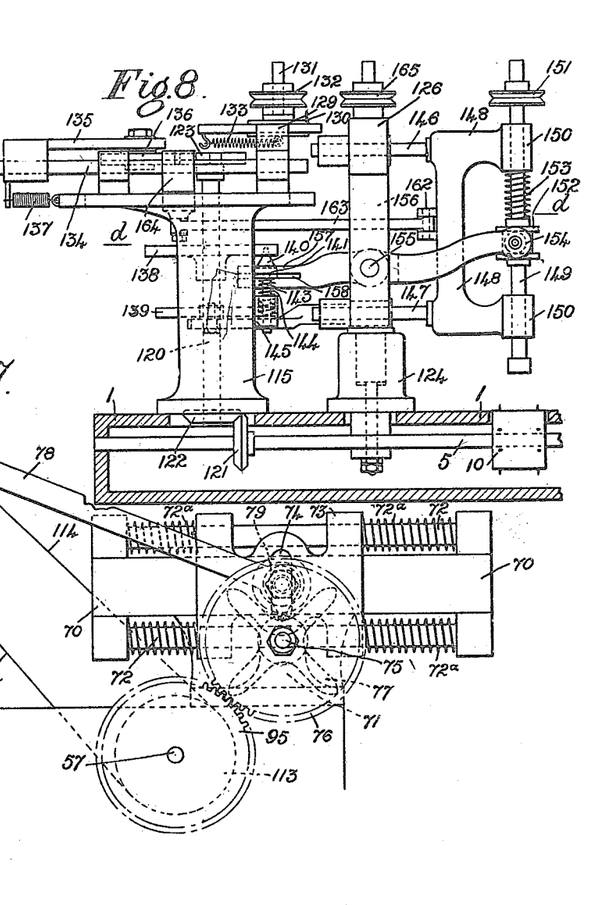
Fig. 8 is a front elevation and Fig. 9 a plan of a mechanism for cutting grooves and the like or for forming beads, knobs, and like ornamentation connected to the bed and operated from the shaft of Fig. 2.
Figure 9:
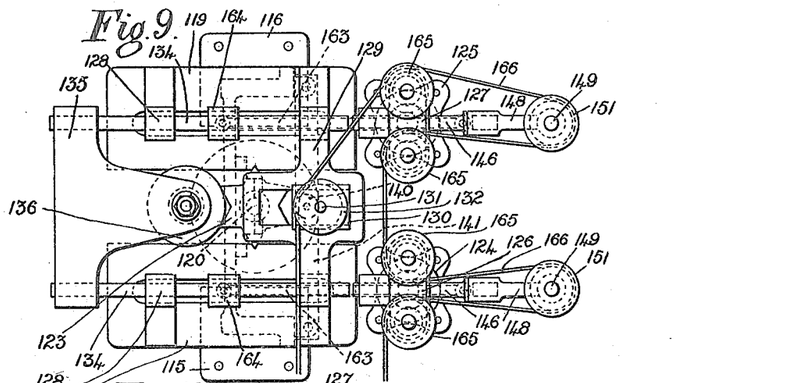
Figure 10:
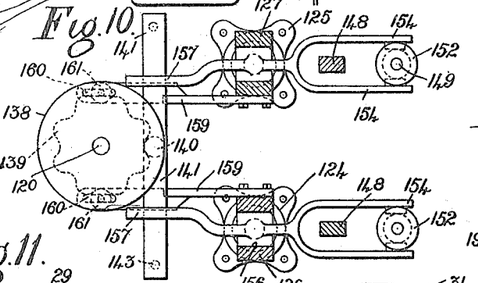
Fig. 10 is a section of Fig. 8 on line $d\,d$.

In Figs. 8, 9 and 10, I have shown a mechanism for cutting grooves and the like or for forming beads, knobs and like ornamentations. In this case I mount two standards 115, 116 on the bed plate 1 at 117 (see Fig. 2) carrying slotted plates 118, 119. Between the standards 115, 116 is a vertical spindle 120 geared to one of the shafts 5 through bevel wheels 121, 122 fixed to the top of the spindle 120 and above the plates 118, 119 is a star wheel 123. Near these standards 115, 116 are fixed two sockets 124, 125 carrying posts 126, 127 which can revolve in said sockets. On the plates 118, 119 are lugs 128 and a bridge piece 129 carrying a sliding plate 130 to which is fixed a spindle 131 carrying a pulley wheel 132, the sliding plate 130 being normally drawn outward from the work by a spring 133. Sliding through holes in lugs 128 and bridge piece 129 are rods 134 carrying a plate 135 having a wheel 136 riding against the star wheel 123, the plate 135 and wheel 136 being normally pressed against the star wheel 123 by a spring 137. On the spindle 120 are also fixed a disk 138 and a wheel 139 with corrugated teeth. On the under side of the disk 138 is a groove varying in depth in which rides a pin 140 mounted on a plate 141 at each end of which are pins 143 encircled by springs 144 in such manner as to press the plate 141 upward and with the pin 140 into the groove. The pins 143 are mounted on projections 145 on the standards 115, 116. Each post 126, 127 has holes in which are sliding arms 146, 147 of the brackets 148 which carry the tool holding spindles 149 rotating in the bearings 150, the spindle carrying a grooved pulley 151 and a collar bearing 152 pressed by a spring 153 and engaged by forked arms 154 which oscillate upon the pins 155 in a chamber or hollow 156 of each post 126, 127. The other end 157 of the fork 154 is slotted at 158 to engage with the plate 141. To each post 126, 127 is attached arms 159 provided with slotted ends 160 carrying rollers 161 which ride over the corrugated teeth on the wheel 139. The brackets 148 are attached by lugs 162 to one end of connecting rods 163, the other end being connected to blocks 164 attached to the rods 134, which blocks 164 reciprocate in the slots in plates 118, 119. On the posts 126, 127 are mounted pulley wheels 165, the spindles 149 being revolved by band or cord 166 from any suitable part of the machine. The pulley wheel 132 acts as a tensioning pulley. In the mechanism illustrated in these figures the spindles 149 do not travel with the molding while cutting.

In action the shaft 5 revolves the spindle 120 through bevel wheels 121, 122 and with it the star wheel 123, grooved disk 138 and corrugated toothed disk 139, which disk 139 in revolving forces out the arms 159 so rocking the posts 126, 127 (which may be spring controlled) that the brackets 148 and spindles 149 will be moved to and from each other. At the same time the groove on the disk 138 in revolving acts upon the pin 140 and plate 141 raising and lowering it and thereby rocking the forked levers 154 vertically on the pivots 155 and so raising or lowering the spindles 149 to and from the molding. The star wheel 123 also revolving will gradually force back the plate 135 and also the rods 134 and connecting rod 163, which will reciprocate the brackets 148 and spindles 149 horizontally.

For a straight vertical cut I use apparatus hereafter described and shown on Figs. 1 and 2. In this case the cutters enter the molding vertically and travel with it before being withdrawn and thereby gives a clean cut. On the bed plate 1 are mounted two vertical rods 167 on which slides a frame 168 which carries a slidable plate 169 to which the chisels or cutters are fixed.

On the bed plate 1 is also fixed a standard 170 having pivoted to its top end a bar 171 which is connected to the frame 168 by a link 172 pivoted at 173, 174. The other end of the bar 171 carries an adjustable sleeve 176 to which one end of a rod 178 is pivoted. The lower end of the rod 175 has a pin or block 177 adjustable in a slot 178 in a disk 179 carried by a short axle 180 mounted under the bed plate 1 on which is mounted a gear wheel 181 meshing with a gear wheel 182 mounted on the shaft 6. To the plate 169 is pivoted one end of a connecting rod 183, the other end having a pin or block 184 adjustable in a slot 185 on a disk 186 carried by a short axle mounted in a bracket 187. This axle also carries gear wheels 188, 189, meshing with a gear wheel 189$^a$ mounted on the shaft 5.

In action the tool holder plate 169 is given a vertical reciprocating motion and a longitudinal reciprocating motion by means of the connecting rods 171 and 183, so that the cutters will enter the molding vertically and travel horizontally with the work.

Figure 11:
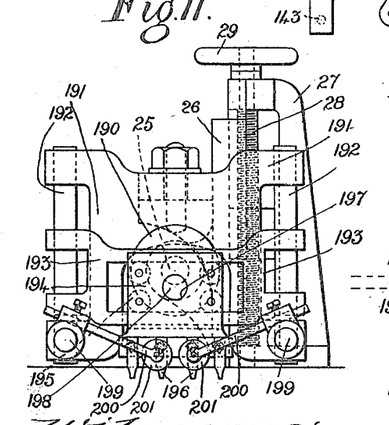
Fig. 11 is a front elevation and Fig. 12 a plan of mechanism for making vertical cuts in the molding and traveling with the molding, this mechanism being employed in substitution for revolving vertical cutters shown in Fig. 1 employed at the commencement of the operations.
Figure 12:
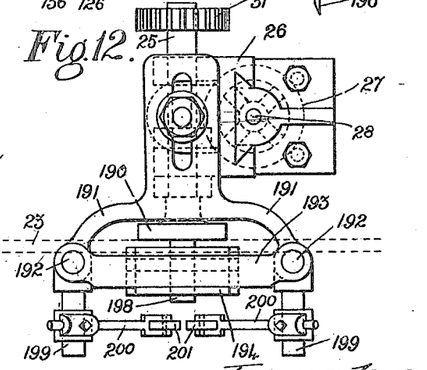
Figure 13:
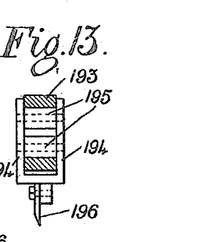
Fig. 13 is section of a cutter and its carrier shown in Fig. 11.

In place of the cutting disk mechanism 24 previously described I may use the apparatus shown in Figs. 11, 12 and 13 hereafter described which will give a straight vertical cut. In this case I employ the standard 27, screw spindle 28 worked by handle 29 and sliding block 26 as in the former case referred to, also the short axle 25 and gear 31 but in place of the cutting disk 24, I employ a crank disk 190. To the block 26 is adjustably secured a bracket 191 carrying guide rods 192 and moving vertically on these guide rods 192 is a frame 193 in which slides horizontally a carriage 194, provided with friction rollers 195. To this carriage 194 are fixed the chisels or cutters 196. In the carriage 194 is a hole 197 in which the pin 198 of the crank disk 190 works. On studs 199 on the bracket 191, I may mount adjustable rods 200 carrying pressure rollers 201 at their ends for pressing down on the molding. In action the carriage 194 carrying the cutters 196 and frame 193 have an up and down motion imparted to them by the crank disk 190 which at the same time gives a horizontal movement to the carriage 194 which slides on the frame 193.

Figure 14:
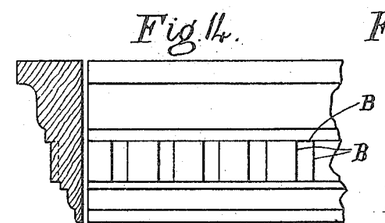
Fig. 14 illustrates a section of molding having received the first cuts of the ornamenting process by the rotary cutters 24.
Figure 15:
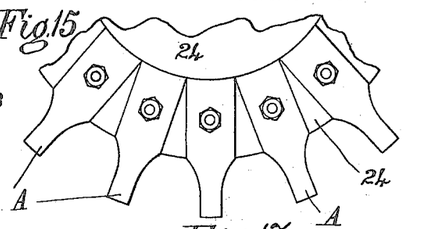
Fig. 15 is a fragmentary detail view of the rotary cutter 24.
Figure 16:
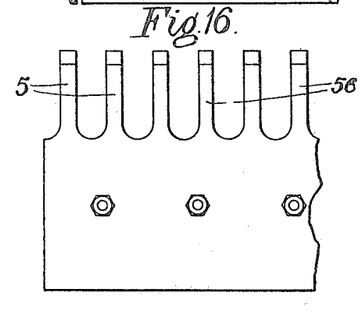
Fig. 16 is a fragmentary detail view of the horizontal cutters 56.

In producing the ornamentation on the molding shown in Fig. 14 the first cut is made by the cutters A on the two cutting disks 24, shown in Figs. 1, 15, 22 and 23, which produce a relief cut and in conjunction with each other give the right angle cuts B B. The second cut is made by the horizontal cutters 56 (see Fig. 16) which are used in connection with and operated by the mechanism shown in Fig. 4. These cutters slide in and cut out the dental with a reciprocating movement, the final cut being made by a vertical cutter shown in Fig. 24 and secured in the holder 169, Fig. 1. This cutting tool in the holder 169 makes the final cut on the molding shown in Fig. 14 by cutting a small gap between the cuts $b$ by removing portions of the material which could not be cut between the two L-shaped cutters on the disk 24.

Figure 17:
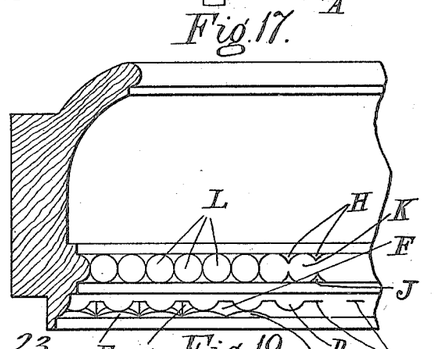
Fig. 17 is a view illustrating a section of molding produced by the present machine.
Figures 18, 19, 20, 21, 22, 23, 24, 25, 26:
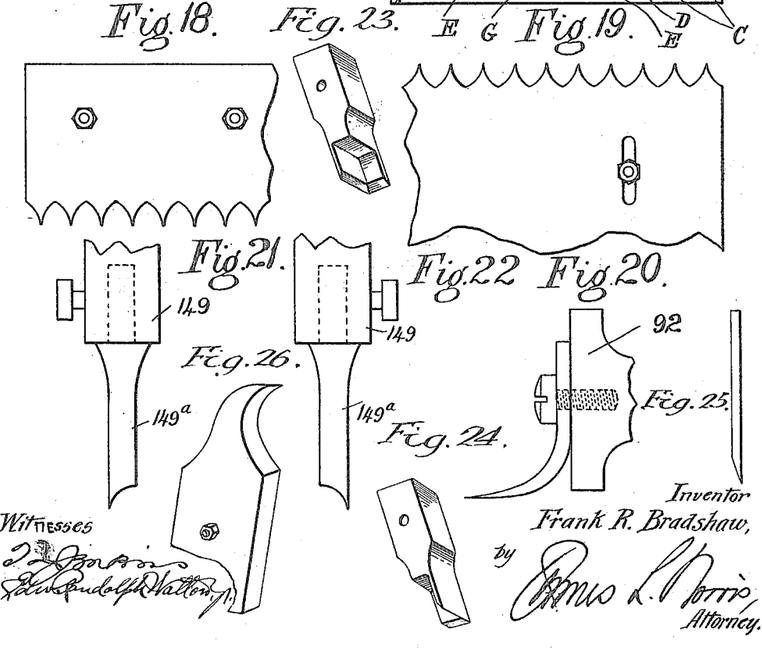
Figs. 18, 19 and 20 are fragmentary detail views of the cutting tools for producing beads on the molding.
Figs. 21 and 22 illustrate tools for finishing and completing the beads on the molding.
Figs. 23 and 24 are perspective views of the chisel-shaped cutters employed on the disk 24 (Fig. 15) for making the right angle cuts b in the molding shown in Fig. 14.
Fig. 25 is a side view of the chisel-shaped cutter which is suitably clamped to the plate or tool holder 169 clearly shown in Fig. 1.
Fig. 26 is a perspective view of the cutter which is suitably secured to the plate or horizontal revolving tool holder 34 shown in Fig. 3.

For more ornamental design molding, such as is shown in Fig. 17, more of the cutting tools previously described are employed. In this case, the first cuts made upon the molding are those made by the revolving cutter disks 24, (see Figs. 1 and 2), having suitable chisel cutters A, which, in this case, produce the straight cuts marked C. The half circles D are then cut by a round tool carried by the cutter operating mechanism shown in Figs. 11 and 12. One or more of the horizontal revolving cutter mechanisms as shown in Fig. 3, carrying a tool as shown in Fig. 25, are set into operation to cut away the circular parts E. The next cutter mechanism, shown in Fig. 4, comes into operation, and by the employment of suitably shaped tools, horizontally cuts away the part indicated by the letters F, leaving it as shown at G. The next operation is that of the mechanism shown in Figs. 6 and 7 to produce the beads on the molding, and in connection with these mechanisms, tools, as shown in Figs. 18, 19 and 20, are used. The tool 18 is mounted on the member 92 to cut away the portions H and the tool shown in Fig. 19 is mounted upon the member 84 and cuts away the portions marked J, thus leaving the raised parts or circles K. Next, the mechanisms shown in Figs. 8 and 9 are brought into operation and carry the tool 149$^a$ in the tool stock 149, shown in Figs. 21 and 22, which act upon the circular part K and are revolved at a high speed to round and finally complete the beads, as shown at L. It will thus be seen that in producing the molding, as shown in Fig. 17, all the cutting mechanisms are brought into action with the exception of the vertical cutting mechanism having the tool stock 169, see Fig. 1.

What I do claim as my invention and desire to secure by Letters Patent is:—

1. In combination, a bed plate over which work passes, a plurality of mechanisms arranged along said plate in sequence and adapted to operate upon said work, said cutter mechanisms comprising revolving chisels, a horizontal cutter, a horizontal rotary cutter, a drill cutter and a vertical straight cutting mechanism, and means controlled by the advance of the work over said plate for operating said cutters in proper sequence.

2. A molding cutting machine comprising a bed plate over which the molding passes, a vertical rotary tool holder, a horizontally movable tool holder, a horizontally movable vertically rotatable tool holder, a tool operating mechanism for forming beads on said molding, a vertically movable tool holder, all arranged in sequence and adapted to operate relatively to the bed plate and said molding, and means controlled by the advance of the work over said plate for actuating said holders and tool operating mechanism in proper sequence, said molding being effectively operated upon when tools are carried in said holders.

3. A molding cutting mechanism comprising a bed plate over which molding passes, a plurality of cutting mechanisms arranged to operative relative to said bed plate and upon said molding to produce a composite ornamentation on the latter, and means controlled by the presentation of the work to each cutting mechanism for operating each cutting mechanism in proper sequence to produce the desired design.

4. A molding cutting machine comprising a bed plate over which said molding passes, a plurality of cutting mechanisms arranged to operate relative to said bed plate and to operate upon said molding to produce a composite ornamentation on the latter, and means for operating each cutting mechanism at a relative movement controlled by the rate at which said molding passes over said plate so that the various cutting mechanisms are timed to operate upon the molding at a proper point in the feed of the latter.

5. A molding ornamenting machine comprising a bed plate over which the molding is fed, rollers on said plate actuated by the feed of said molding over the latter, a plurality of cutting mechanisms arranged to operate relatively to said plate and to operate on said molding to produce a composite design, said mechanisms being operated by said rollers, thereby regulating the speed of the operation of said mechanisms according to the movement of feed of said molding.

6. A molding ornamenting machine comprising a bed plate over which the molding is fed, a plurality of cutting mechanisms arranged along the said bed plate and adapted to produce a composite design upon said molding, a roller for each cutting mechanism mounted on said bed plate and operated by the feeding movement of the molding, and an operative connection between said roller and said mechanism for causing the latter to operate upon the molding in proper sequence and at a rate of speed corresponding to the feeding movement of the molding.

7. A molding ornamenting machine comprising a bed plate over which the molding is fed, a plurality of cutting mechanisms arranged along the said bed plate and adapted to produce a composite design upon said molding, a roller for each cutting mechanism mounted on said bed plate and operated by the feeding movement of the molding, and an operative connection between said roller and said mechanism for causing the latter to operate upon the molding in proper sequence and at a rate of speed corresponding to the feeding movement of the molding, certain of said cutting mechanisms being adapted to move with said molding while operating thereupon, and means actuated by a preceding roller for controlling the movement of said certain cutting mechanisms.

In testimony whereof I have hereunto set my hand in presence of two subscribing witnesses.

FRANK RAY BRADSHAW.

Witnesses:
FRED HUTCHINGS,
WM. O. BROWN.

Copies of this patent may be obtained for five cents each, by addressing the "Commissioner of Patents, Washington, D. C."